US010085147B2

(12) United States Patent
Benson et al.

(10) Patent No.: US 10,085,147 B2
(45) Date of Patent: Sep. 25, 2018

(54) CONFIGURING NETWORK ACCESS PARAMETERS

(71) Applicant: Exosite LLC, Minneapolis, MN (US)

(72) Inventors: Mark Dennis Benson, Plymouth, MN (US); Hans Aaron Rempel, Minneapolis, MN (US)

(73) Assignee: Exosite LLC, Minneapolis, MN (US)

( * ) Notice: Subject to any disclaimer, the term of this patent is extended or adjusted under 35 U.S.C. 154(b) by 0 days.

(21) Appl. No.: 14/640,695

(22) Filed: Mar. 6, 2015

(65) Prior Publication Data
US 2015/0257008 A1 Sep. 10, 2015

Related U.S. Application Data

(60) Provisional application No. 61/950,079, filed on Mar. 8, 2014.

(51) Int. Cl.
*H04L 29/06* (2006.01)
*H04W 12/04* (2009.01)
*H04W 84/12* (2009.01)

(52) U.S. Cl.
CPC .............. *H04W 12/04* (2013.01); *H04L 63/18* (2013.01); *H04W 84/12* (2013.01)

(58) Field of Classification Search
CPC ........ H04W 12/04; H04W 84/12; H04L 63/18
See application file for complete search history.

(56) References Cited

U.S. PATENT DOCUMENTS

| 8,494,576 | B1 | 7/2013 | Bye et al. | |
| 2006/0153153 | A1* | 7/2006 | Bhagwat | .................. H04K 3/65 370/338 |
| 2008/0057957 | A1* | 3/2008 | Altbaum | ............... H04W 8/245 455/435.1 |
| 2011/0019826 | A1* | 1/2011 | Browning | ............. H04W 24/00 380/283 |
| 2011/0084800 | A1 | 4/2011 | Ko et al. | |
| 2013/0103780 | A1 | 4/2013 | Panther | |
| 2015/0081859 | A1* | 3/2015 | Xu | ...................... H04L 41/0806 709/222 |

FOREIGN PATENT DOCUMENTS

| EP | 2096829 A1 | 9/2009 |
| WO | 2013045924 A1 | 4/2013 |

OTHER PUBLICATIONS

PCT International Searching Authority, The International Search Report and Written Opinion dated May 26, 2015 for International Application No. PCT/US2015/019259, 11 pages.

* cited by examiner

Primary Examiner — Meng Li
(74) Attorney, Agent, or Firm — Merchant & Gould P.C.

(57) ABSTRACT

A method for configuring network access parameters for a smart object to access a network is disclosed. The method comprises connecting, by the smart object, to a network using a first network access device. The smart object uses a wireless networking protocol to connect to the first network access device. The method further comprises authenticating the smart object with a server on the network and receiving network access information from the server. The network access information relates to a second network access device. The method further comprises using the network access information to connect to the network using the second network access device.

17 Claims, 13 Drawing Sheets

CONFIGURING NETWORK ACCESS PARAMETERS

CROSS-REFERENCE TO RELATED APPLICATION

This application claims priority to U.S. Application Ser. No. 61/950,079, filed on Mar. 8, 2014, titled CONFIGURING NETWORK ACCESS PARAMETERS, the disclosure of which is hereby incorporated by reference in its entirety.

BACKGROUND

Many everyday objects now include network capabilities. For example, these objects may connect to a server on the Internet to record status information or measurements that relate to the object. Additionally, the objects can receive information, instructions, and new software from the server as well. For example, using this capability, a manufacturer may deploy a firmware upgrade for some of the objects without requiring any user interaction with the object by its owner.

Generally, these network-enabled objects generate machine-to-machine communication. That is, one machine, the object, communicates with another machine, the server. However, this machine-to-machine communication is only possible when the object and the server are able to connect to one another through a network.

Because the objects are deployed in a wide variety of environments, the manufacturer, seller, or installer of the object may not be able to control, configure, or even access the network in the environment. Additionally, often the owner or user of the object or manager of the environment where the object is being installed will not want to reveal information about the network to the installer.

SUMMARY

In general terms, this disclosure is directed to configuring network access for a smart object. In one possible configuration and by non-limiting example, the smart object is configured to retrieve network access information through an initial network access device. Various aspects are described in this disclosure, which include, but are not limited to, the following aspects.

One aspect is a method for configuring a smart object to access a network. The method comprising connecting, by the smart object, to a network using a first network access device, wherein the smart object uses a wireless networking protocol to connect to the first network access device; authenticating the smart object with a server on the network; receiving network access information from the server, wherein the network access information relates to a second network access device; and using the network access information to connect to the network using the second network access device.

Another aspect is a smart object. The smart object comprising a functional object, the functional object being configured to perform a function; a sensor system, the sensor system being configured to measure a property of the functional object; and a network communication engine comprising: a central processing unit that is configured to control the network communication engine; and a computer readable data storage medium storing software instructions that, when executed by the central processing unit, cause the network communication engine to: connect to a network using a first network access device using a wireless networking protocol; authenticate with a server on the network; receive network access information from the server, wherein the network access information relates to a second network access device; use the network access information to connect to the network using the second network access device; and transmit measurements from the sensor system to the server.

Yet another aspect is a method for providing network access information to a smart object. The method comprising receiving, by a server computing device, through a network, a smart object identifier from the smart object, wherein the smart object is connected to the network through a first network access device; identifying the smart object, wherein the smart object is identified based on the smart object identifier; identifying network access information for the smart object, wherein the network access information relates to accessing a second network access device; and transmitting the network access information to the smart object.

Another aspect is a method of installing a smart object. The method comprising inputting local network access information to a server computing device, wherein the local network access information is associated with a local network access device; activating an initial network access device to provide access to a network; connecting, by the smart object, to the initial network access device using a wireless networking protocol; authenticating, by the smart object, with the server; receiving the local network access information from the server; connecting, by the smart object, to the local network access device, wherein the smart object uses the local network access information to connect to the local network access device; and deactivating the initial network access device.

DETAILED DESCRIPTION

Figure 1:
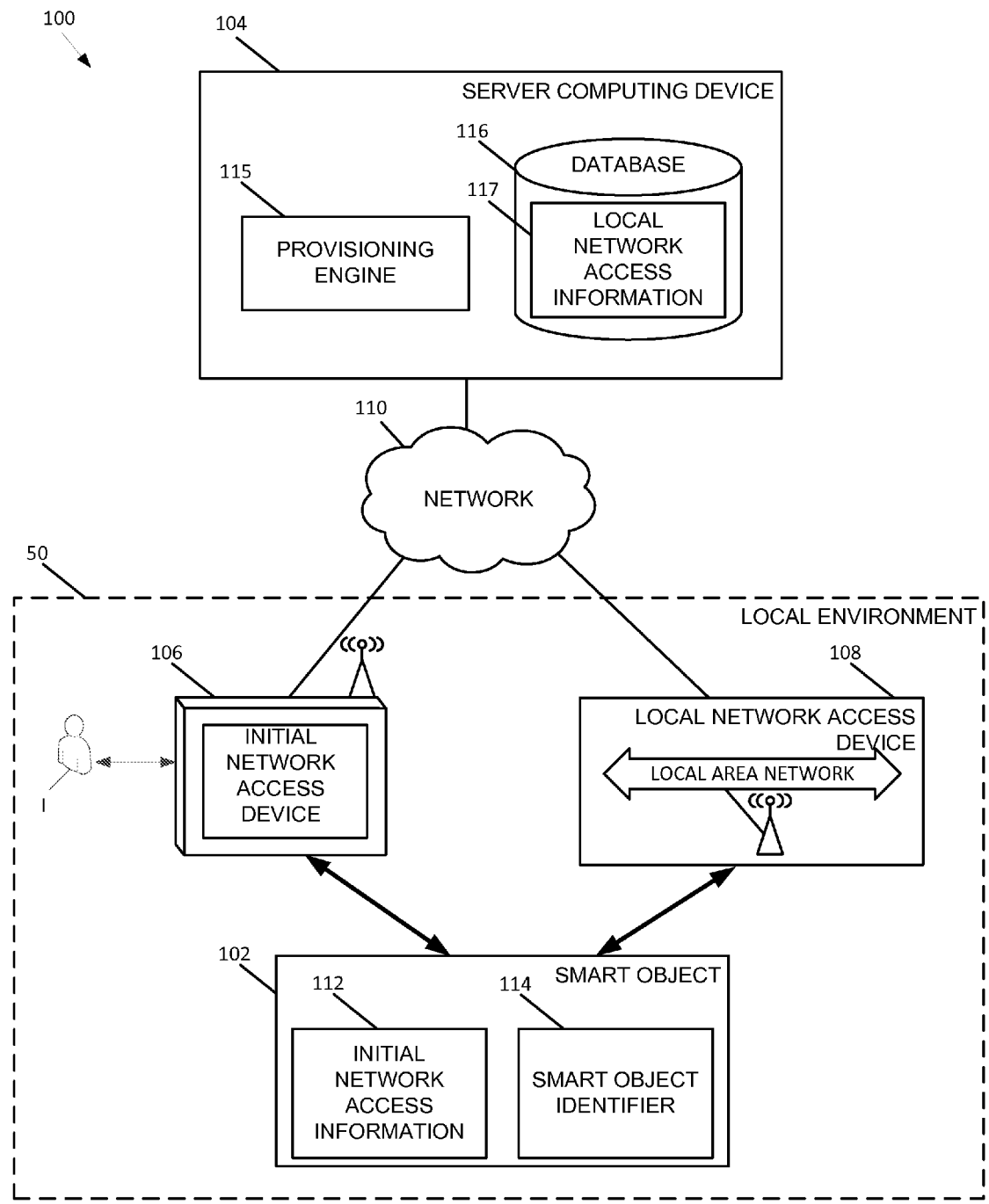
FIG. 1 illustrates an exemplary embodiment of a system for configuring network access parameter.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure describes systems and methods for configuring network access parameters on a device. In some embodiments, the device is a smart object that provides network-based monitoring or control capabilities. In at least some embodiments, a smart object is an appliance, such as a water heater, furnace, or garage door, that can be monitored or controlled from a network-based computing device. In at least some other embodiments, a smart object monitors and controls a light or another electronic device that is connected to a power outlet. There are many other embodiments of smart objects as well.

In at least some embodiments, a smart object transmits measurements or status information and other data to a server computing device through a network. Additionally, in at least some embodiments, a smart object receives commands or instructions from the server computing device through the network. For example, in at least some embodiments, the server computing device is a cloud server and is connected to the smart object through the Internet. In at least some other embodiments, the smart object connects to a different type of server computing device over a different network.

In at least some embodiments, the smart object connects to the network through a local network access device. In at least some embodiments, the local network access device is secured and cannot be accessed without using the correct local network access information. In at least some embodiments, the local network access device is a device that connects two networks (e.g., a wireless local area network and a wired local area network or wide area network). Some example embodiments of the local network access device include Wi-Fi (IEEE 802.11a/b/g/n) and Bluetooth access points and routers.

Further, in some embodiments, the smart object does not include a user interface or any input/output devices through which a user may input the information necessary to connect to the local network access device. Instead, in at least some embodiments, the smart object first connects to the network through an initial network access device. In some embodiments, the initial network access device is a portable device that can be transported by an installer of the smart object. For example, in at least some embodiments, the initial network access device is a mobile hotspot, such as a cellular wireless access point. Further, in some embodiments, the initial network access device uses network parameters (e.g., SSID (or network name), passphrase, and security mode) that match the parameters in the initial network access information 112 stored by the smart object. In at least some embodiments, the smart object is configured to search for an initial network access device using the initial network access information if the smart object is not currently connected to a network access device.

Once connected to the initial network access device, the smart object connects to the server computing device. In some embodiments, the server computing device associates the smart object with an owner and a local network access device based on the serial number or other identifier of the smart object. In at least some embodiments, the smart object establishes a secure connection and then requests the network connection information for the local network access device from the server computing device.

In at least some embodiments, after receiving the network connection information for the local network access device, the smart object disconnects from the initial network access device and then connects to the local network access device using the network connection information.

In this manner, the system configures the smart object to connect over a local network access device without manual intervention. Further, the network access information can be kept confidential and does not need to be shared with the installer of the smart object.

FIG. 1 illustrates an exemplary embodiment of a system 100 for configuring network access parameters. The system 100 includes a smart object 102, a server computing device 104, an initial network access device 106, a local network access device 108, and a network 110. Also shown is an installer I and the local environment 50.

The local environment 50 is the environment where the smart object 102 will be installed. The local environment 50 can be any type of environment. In at least some embodiments, the local environment 50 is a residential, commercial, industrial, natural, healthcare, or military environment. In at least some other embodiments, the local environment 50 is a different environment.

The smart object 102 is a device that transmits information to and receives information from the server computing device 104 through the network 110. For example, in at least some embodiments, the smart object 102 transmits measurements or status information to the server computing device 104 and receives instructions from the server computing device 104. In at least some other embodiments, the smart object 102 is used in a different environment.

In at least some embodiments, the smart object 102 includes initial network access information 112 and a smart object identifier 114. The initial network access information 112 includes parameters the smart object 102 can use to connect to the initial network access device 106. The smart object identifier 114 is a value that operates to identify the smart object 102 to the server computing device 104. For example, in at least some embodiments, the smart object identifier 114 is a serial number or media access control (MAC) address of the smart object 102. In at least some embodiments, the initial network access information 112 and the smart object identifier 114 are stored in the memory of the smart object 102.

The server computing device 104 is a device that operates to receive and transmit information to the smart object 102. In at least some embodiments, the server computing device 104 includes a provisioning engine 115 and a database 116, including local network access information 117.

In at least some embodiments, the provisioning engine 115 operates to associate the smart object 102 with an entity and to provision resources, such as an API key, to the smart object 102. In at least some embodiments, the provisioning engine 115 associate the smart object 102 with at least one of a location, an end-user, or an owner. In at least some other embodiments, the provisioning engine 115 associates the smart object 102 with a different type of entity.

The database 116 is a data storage device configured to store a variety of information. Examples of the database 116 include a hard disk drive, a collection of hard disk drives, digital memory (such as random access memory), a redundant array of independent disks (RAID), or other data storage devices. In some embodiments information is distributed across multiple local or remote data storage devices. The database 116 stores data in an organized manner, such as in a hierarchical or relational database structure, or in lists and other data structures such as tables. Although the database 116 is illustrated as being a component of the server computing device 104, in at least some embodiments the database 116 is separate from the server computing device 104.

The local network access information 117 includes parameters the smart object 102 can use to connect to the local network access device 108. In at least some embodiments, the local network access information 117 is stored in the database 116. However, in at least some other embodiments, the local network access information 117 is stored outside of the database 116.

Additionally, in some embodiments, the provisioning engine 115 stores local network access information 117 associated with the smart object 102, location, end-user, or owner. In at least some embodiments, the local network access information 117 comprises a service set identifier (SSID) for a 802.11 wireless LAN network and an associated passphrase. In at least some other embodiments, the local network access information 117 includes a Bluetooth device name or address and a personal identification number (PIN) code. At least some other embodiments of the local network access information 117 include other information or parameters.

The initial network access device 106 is a device that provides access to the server computing device 104 through the network 110. In at least some embodiments, the initial network access device 106 generates a wireless local area network and connects that wireless local area network to the network 110. Additionally, in at least some embodiments, the initial network access device 106 is configured to be accessed using initial network access information 112. For example, in some embodiments, the initial network access device 106 is configured to be accessed using a initial SSID and security key. In some embodiments of the system 100, the smart object 102 is configured to connect to a network using the initial network access information 112. In this manner, the smart object 102 can connect to the initial network access device 106 without requiring any user input. Further, in at least some other embodiments, the initial network access device 106 is configured to generate an unsecure wireless network that does not require a security key.

In at least some embodiments, the initial network access device 106 is a portable device that is transported to the local environment 50 by the installer I. In at least some embodiments, the initial network access device 106 is a mobile cellular wireless access point, such as the MIFI mobile hotspot from Novatel Wireless of San Diego, Calif. In other embodiments, the initial network access device 106 is a smart phone, such as the IPHONE from Apple Inc. of Cupertino, Calif. or another smart phone running the WINDOWS operating system from Microsoft Corporation of Redmond, Wash., or the ANDROID operation system from Google, Inc. of Mountain View, Calif. In at least some other embodiments, the initial network access device 106 is a pocket-sized, single-purpose device that is used only as the initial network access device for the system 100. Other embodiments of the initial network access device 106 are possible as well.

In at least some embodiments of system 100, the initial network access device 106 is removed from the local environment 50 after the smart object 102 has received the local network access information 117 for the local network access device 108.

The local network access device 108 is a device that provides access to the server computing device 104 through the network 110. In at least some embodiments, the local network access device 108 generates a secure wireless local area network and connects that wireless local area network to the network 110. In at least some embodiments, the SSID and security key of the wireless local area network may be set to any value and are unknown to the installer I throughout the installation process.

In at least some embodiments, the local network access device 108 is a wireless router or a wireless access point. Examples of wireless routers include the Linksys WRT54GL Wireless-G router from Linksys of Irvine, Calif. Other embodiments of the local network access device 108 are possible as well.

The network 110 communicates digital data between one or more computing devices, such as between the server computing device 104 and the smart object 102. Examples of the network 110 include a local area network and a wide area network, such as the Internet.

In some embodiments, the network 110 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

In general, the installer I installs and configures the smart object 102 in the local environment 50. The installer I also transports the initial network access device 106 to the local environment 50. After the smart object 102 is installed, the installer I activates the initial network access device 106. The smart object 102 then connects to server computing device 104 through the network 110, which it accesses through the initial network access device 106. The smart object 102 requests the local network access information 117 from the server computing device 104. After receiving the network access information, the smart object 102 connects to the server computing device 104 through the network 110, which it then access through the local network access device 108. The installer I can then deactivate the initial network access device 106 and remove it from the local environment 50. At this point, the smart object 102 is installed and configured to access the network 110 through the local network access device 108.

Figure 2:
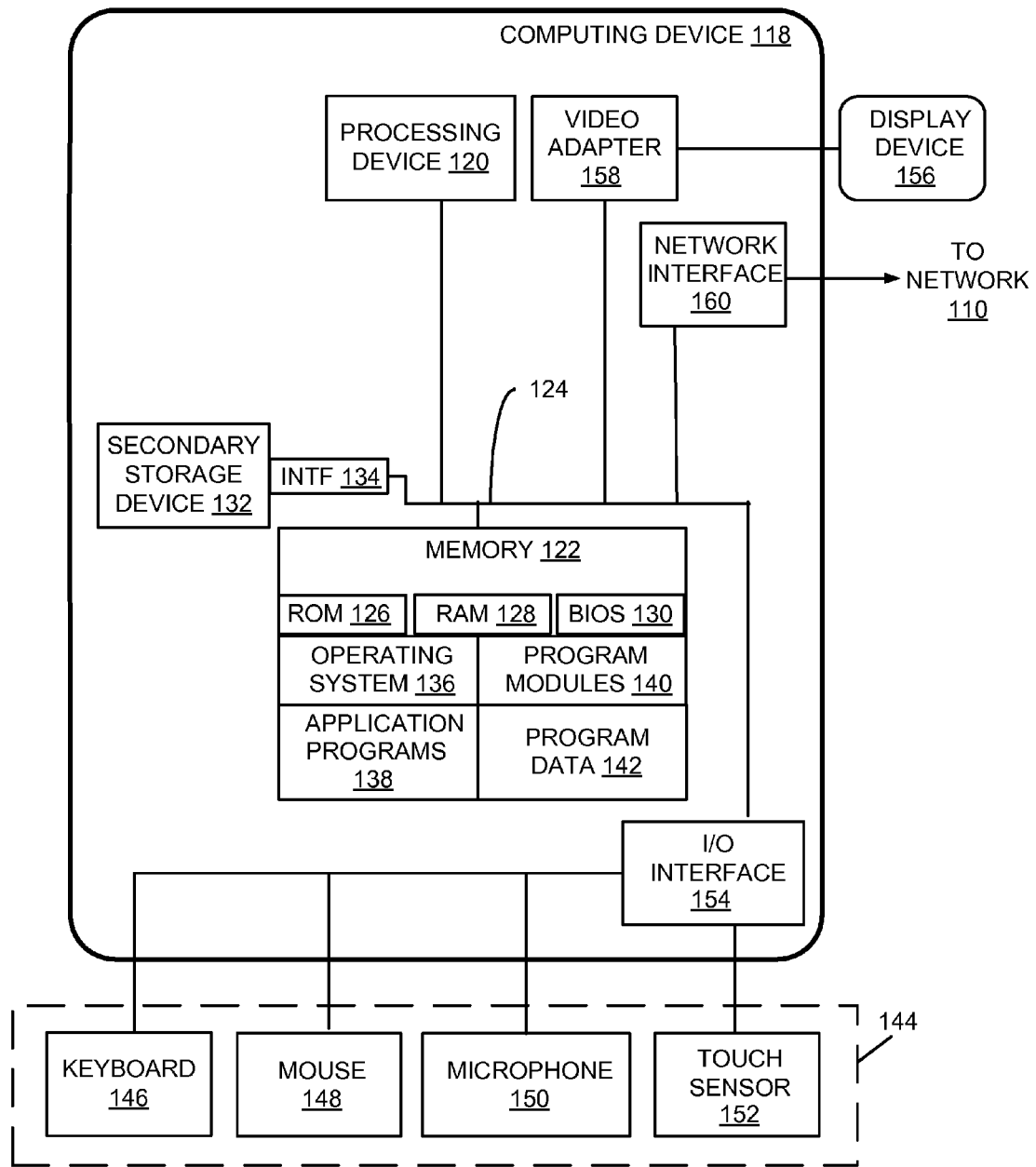
FIG. 2 illustrates an exemplary architecture of a computing device that can be used to implement aspects of the present disclosure.

FIG. 2 illustrates an exemplary architecture of a computing device that can be used to implement aspects of the present disclosure, including the smart object 102, the server computing device 104, the initial network access device 106, and the local network access device 108 and will be referred to herein as the computing device 118. One or more computing devices, such as the type illustrated in FIG. 2, are used to execute the operating system, application programs, and software modules (including the software engines) described herein.

The computing device 118 includes, in at least some embodiments, at least one processing device 120, such as a central processing unit (CPU). A variety of processing devices are available from a variety of manufacturers, for example, Intel or Advanced Micro Devices. In this example, the computing device 118 also includes a system memory 122, and a system bus 124 that couples various system components including the system memory 122 to the processing device 120. The system bus 124 is one of any number of types of bus structures including a memory bus or memory controller, a peripheral bus, and a local bus using any of a variety of bus architectures.

Examples of computing devices suitable for the computing device 118 include a desktop computer, a laptop computer, a tablet computer, a mobile phone device such as a smart phone, or other devices configured to process digital instructions.

The system memory 122 includes read only memory 126 and random access memory 128. A basic input/output system 130 containing the basic routines that act to transfer information within computing device 118, such as during start up, is typically stored in the read only memory 126.

The computing device 118 also includes a secondary storage device 132 in some embodiments, such as a hard disk drive, for storing digital data. The secondary storage device 132 is connected to the system bus 124 by a secondary storage interface 134. The secondary storage devices and their associated computer readable media provide nonvolatile storage of computer readable instructions (including application programs and program modules), data structures, and other data for the computing device 118.

Although the exemplary environment described herein employs a hard disk drive as a secondary storage device, other types of computer readable storage media are used in other embodiments. Examples of these other types of computer readable storage media include magnetic cassettes, flash memory or other solid state memory technology, digital video disks, Bernoulli cartridges, compact disc read only memories, digital versatile disk read only memories, random access memories, or read only memories. Some embodiments include non-transitory media.

A number of program modules can be stored in secondary storage device 132 or memory 122, including an operating system 136, one or more application programs 138, other program modules 140, and program data 142. The data used by the computing device 118 may be stored at any location in the memory 122, such as the program data 142, or at the secondary storage device 132.

In some embodiments, computing device 118 includes input devices 144 to enable the caregiver to provide inputs to the computing device 118. Examples of input devices 144 include a keyboard 146, pointer input device 148, microphone 150, and touch sensor 152. A touch-sensitive display device is an example of a touch sensor. Other embodiments include other input devices 144. The input devices are often connected to the processing device 120 through an input/output interface 154 that is coupled to the system bus 124. These input devices 144 can be connected by any number of input/output interfaces, such as a parallel port, serial port, game port, or a universal serial bus. Wireless communication between input devices 144 and interface 154 is possible as well, and includes infrared, BLUETOOTH® wireless technology, 802.11a/b/g/n, cellular or other radio frequency communication systems in some possible embodiments.

In this example embodiment, a touch sensitive display device 156 is also connected to the system bus 124 via an interface, such as a video adapter 158. In some embodiments, the display device 156 is a touch sensitive display device. A touch sensitive display device includes sensor for receiving input from a user when the user touches the display or, in some embodiments, or gets close to touching the display. Such sensors can be capacitive sensors, pressure sensors, optical sensors, or other touch sensors. The sensors not only detect contact with the display, but also the location of the contact and movement of the contact over time. For example, a user can move a finger or stylus across the screen or near the screen to provide written inputs. The written inputs are evaluated and, in some embodiments, converted into text inputs.

In addition to the display device 156, the computing device 118 can include various other peripheral devices (not shown), such as speakers or a printer.

When used in a local area networking environment or a wide area networking environment (such as the Internet), the computing device 118 is typically connected to the network through a network interface, such as a wireless network interface 160. Other possible embodiments use other communication devices. For example, some embodiments of the computing device 118 include an Ethernet network interface, or a modem for communicating across the network.

The computing device 118 typically includes at least some form of computer-readable media. Computer readable media includes any available media that can be accessed by the computing device 118. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 118.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

In at least some embodiments of the computing device 118 that are used to implement aspects of the smart object 102, the server computing device 104, the initial network access device 106, or the local network access device 108 do not include all of the elements illustrated in FIG. 2. For example, in at least some embodiments of the computing device 118 used to implement aspects of the smart object 102, the video adapter 158 is not included. In at least some other embodiments of the computing device 118 other elements are not included as well.

Figure 3:
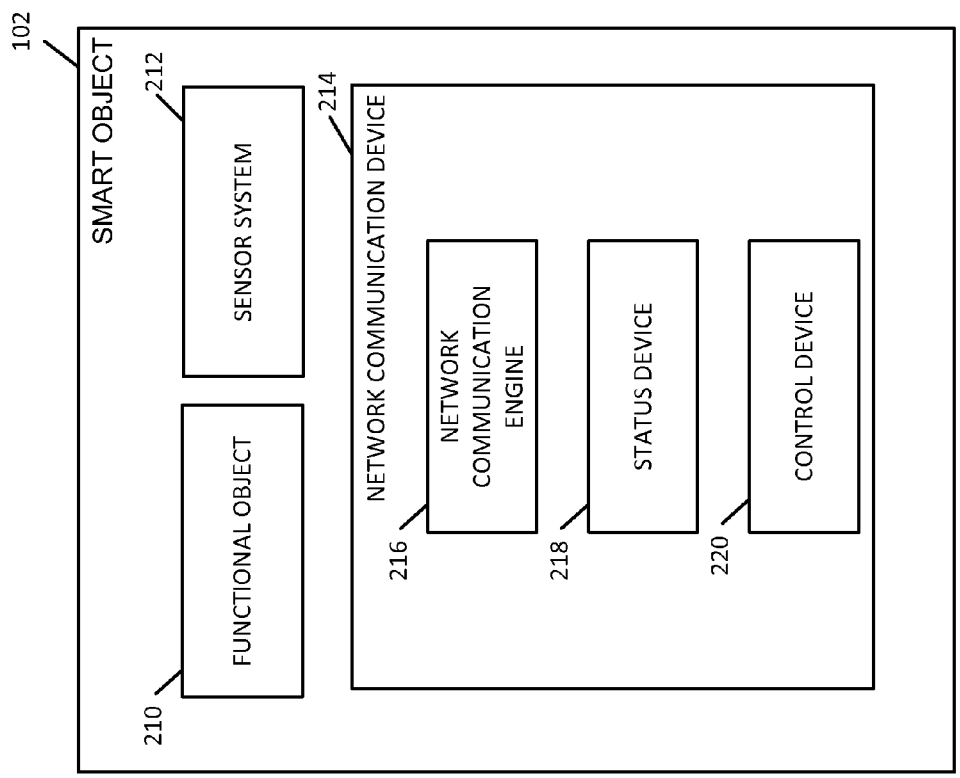
FIG. 3 illustrates an exemplary embodiment of the smart object of FIG. 1.

FIG. 3 illustrates an exemplary embodiment of the smart object 102. In at least some embodiments, the smart object 102 includes a functional object 210, a sensor system 212, and a network communication device 214. In at least some embodiments, the network communication device 214 includes a network communication engine 216, a status device 218 and a control device 220.

The functional object 210 is an object that performs a function. In at least some embodiments, the functional object 210 performs a function in the local environment 50. Examples of functional object 210 include water heaters, furnaces, electrical outlets, garage doors, trash compactors, refrigerators, air conditioners, animal traps, and medical devices. There are many other embodiments of the functional object 210 as well.

The sensor system 212 comprises one or more sensors configured to measure a property or status of the functional object 210. In at least some embodiments, the sensors are a component of the functional object 210. In at least some other embodiments, the sensors are external to the functional object 210 and measure properties or status that are not normally otherwise measured by the functional object 210. In at least some embodiments, the sensor system 212 monitors a temperature, pressure, or status (e.g., on/off) of the functional object 210. Other embodiments of the sensor system 212 are possible as well.

The network communication device 214 is a device that is configured to connect to the server computing device 104 through the network 110 and to transmit data to and receive data from the server computing device 104. In at least some embodiments, the network communication device 214 is a computing device.

The network communication engine 216 operates to connect to the network 110 through the initial network access device 106 and the local network access device 108 as well as to transmit and receive data from the server computing device 104.

The status device 218 operates to indicate a status of the network communication device 214. In at least some embodiments, the status device 218 is controlled by the network communication engine 216 to indicate a network communication status. For example, in at least some embodiments, the status device 218 indicates that the network communication engine 216 is connected to the server computing device 104 through the initial network access device 106 or through the local network access device 108. Additionally, in at least some embodiments, the status device 218 operates to indicate an error condition in the network communication engine 216. In this manner, the status device 218 can indicate to the installer I whether the network communication device 214 is configured and functioning.

In at least some embodiments, the status device 218 comprises one or more devices that emit light. For example, in at least some embodiments, the status device 218 comprises one or more light-emitting diodes (LED). In at least some embodiments, the status device 218 operates to emit light a different character (e.g., a different intensity or different color) depending on whether the network communication engine 216 is using the initial network access device 106 or the local network access device 108. Additionally, in at least some embodiments, the status device 218 emits light of yet a different character to indicate an error condition in the network communication engine 216.

In at least some other embodiments, the status device 218 emits an audible sound to indicate at least some statuses of the network communication engine 216. For example, in at least some embodiments, the status device 218 emits a beep to indicate that the network communication engine 216 has successfully connected to the server computing device 104 using the initial network access device 106. As another example, in at least some embodiments, the status device 218 emits multiple beeps to indicate that the network communication engine 216 has successfully connected to the server computing device 104 using the local network access device 108.

Other embodiments of the status device 218 indicate a status in other ways as well. However, at least some embodiments of the network communication device 214 do not include the status device 218.

The control device 220 operates to receive an input from external to the network communication device 214. In at least some embodiments, the network communication engine 216 is configured to perform a certain action in response to the control device 220 receiving an input. For example, in at least some embodiments, the network communication device 214 is configured to search for and attempt to connect to the initial network access device 106 when the control device 220 receives an input. Further, in at least some embodiments, the network communication device 214 is configured to enter a particular mode or state, such as roaming, when the control device 220 receives an input.

In at least some embodiments, the control device 220 comprises one or more buttons or switches. Other embodiments of the control device 220 receive input in other ways as well. However, at least some embodiments of the network communication device 214 do not include the control device 220.

Figure 4:
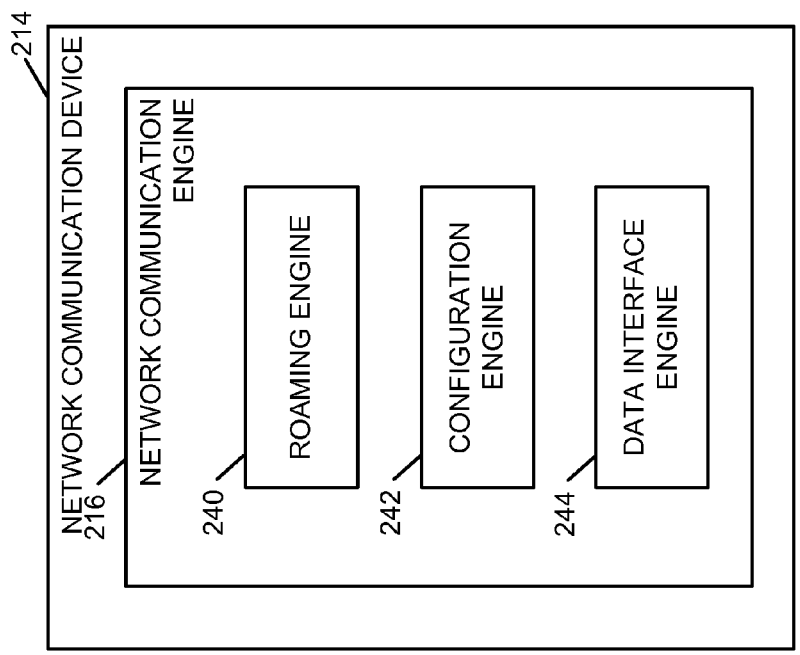
FIG. 4 is a schematic diagram of an embodiment of the network communication engine of FIG. 3.

FIG. 4 is a schematic diagram of an embodiment of the network communication engine 216 of the network communication device 214. In at least some embodiments, the network communication engine 216 includes a roaming engine 240, a configuration engine 242, and a data interface engine 244.

The roaming engine 240 operates when the network communication device 214 is in a roaming mode or roaming state. In at least some embodiments, the roaming engine 240 operates to search for an available network access device, such as the initial network access device 106, to the network 110. In at least some embodiments, the roaming engine 240 also searches for an open (i.e., unsecured) network access device to the network 110. When the roaming engine 240 finds an available network access device to the network 110, the roaming engine 240 attempts to connect to the server computing device 104.

The configuration engine 242 operates when the network communication device 214 is in a roaming mode or state and has connected to the server computing device 104. In at least some embodiments, the configuration engine 242 operates to request and receive the local network access information 117 from the server computing device 104. When the configuration engine 242 has received the local network access information 117 from the server computing device 104, the configuration engine 242 stores the local network access information 117. In at least some embodiments, the configuration engine 242 stores the local network access information 117 in the memory 122. Additionally, in some embodiments, the configuration engine 242 attempts to connect to the network 110 through the local network access device 108 using the local network access information 117 received from the server computing device 104. In at least some embodiments, the network communication device 214 transitions from a roaming state to a configured state after connecting to the network 110 through the local network access device 108.

The data interface engine 244 operates when the network communication device 214 is in a configured state. In at least some embodiments, the data interface engine 244 operates to transmit measurements and status information to the server computing device 104. For example, in at least some embodiments, the data interface engine 244 transmits measurements recorded by the sensor system 212 to the server computing device 104.

Additionally, in at least some embodiments, the data interface engine 244 operates to receive instructions and data from the server computing device 104. For example, in at least some embodiments, the server computing device 104 transmits instructions to activate or deactivate the functional object 210. In at least some other embodiments, the server computing device 104 transmits a firmware upgrade to the data interface engine 244. In at least some embodiments, the firmware upgrade alters the functionality of one or more of the functional object 210, the sensor system 212, or the network communication device 214.

Figure 5:
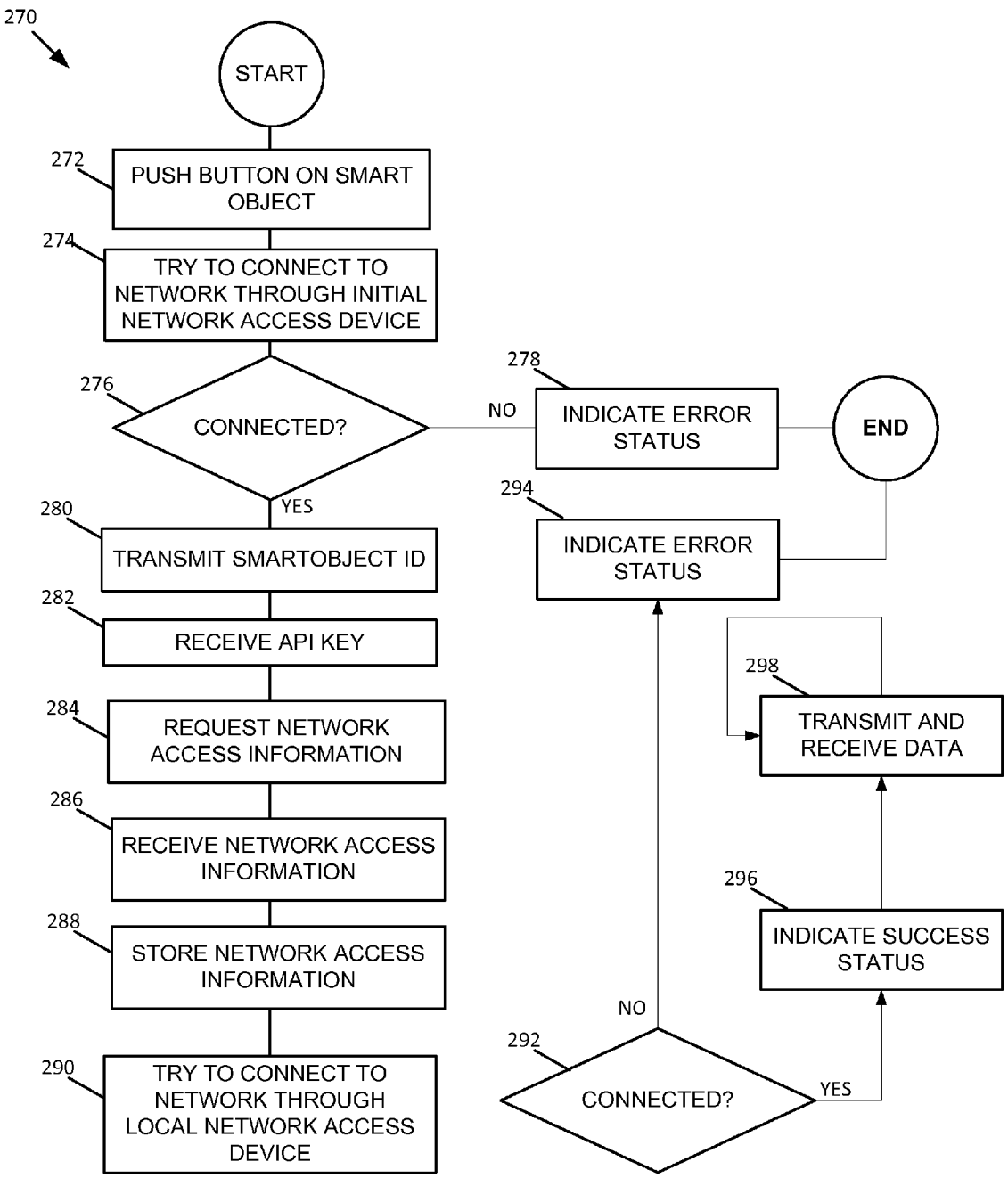
FIG. 5 is a flow chart illustrating an example method of operating the network communication engine of FIG. 3.

FIG. 5 is a flow chart illustrating an example method 270 of operating the network communication engine 216. In this example, the method 270 includes operations 272, 274, 276, 278, 280, 282, 284, 286, 288, 290, 292, 294, and 296. In some embodiments, the method includes operations that are performed by a processor (such as the processing device 120, shown in FIG. 2). As used herein, methods include actions or operations that are performed by a user or executed by a computing device, or combinations of these.

At operation 272, the installer I pushes a button on the smart object 102. In some embodiments, a button is the control device 220.

At operation 274, the network communication engine 216 attempts to connect to the network 110 through the initial network access device 106 using the initial network access information 112 that is stored in the memory 122. In at least some embodiments, the initial network access information 112 is stored permanently in the memory 122, such as in the read only memory 126.

At operation 276, it is determined whether the network communication device 214 is connected to the network 110. If the network communication device 214 is connected to the network, then the method 270 continues to operation 280.

If not, in at least some embodiments, the method 270 continues to operation 278. However, in at least some embodiments, the network communication engine 216 retries connecting to the network 110 a predetermined number of retry attempts before the method 270 continues to operation 278.

At operation 278, the network communication device 214 indicates an error status. In at least some embodiments, the network communication device 214 indicates an error status using the status device 218. For example, in at least some embodiments, the status device 218 emits a light or pattern of light to indicate an error. In at least some other embodiments, the status device 218 produces a sound to indicate an error. Other embodiments are possible as well.

In at least some embodiments, the method 270 terminates after operation 278. However, in at least some embodiments, the network communication engine 216 returns to operation 274 to retry connecting to the network 110 through the initial network access device 106 instead. In at least some embodiments, the network communication engine 216 will make a predetermined number of retry attempts before the method 270 is terminated.

At operation 280, the network communication device 214 transmits the smart object identifier 114 associated with the smart object 102 to the server computing device 104 over the network 110. In at least some embodiments, the server computing device 104 registers the smart object 102 after receiving the smart object identifier 114. Further, in at least some embodiments, the server computing device 104 looks up information, such as an owner and a location, using the smart object identifier 114.

At operation 282, the network communication device 214 receives an application programming interface (API) key In at least some embodiments, the server computing device 104 generates the API key after receiving the smart object identifier 114 sent by the network communication device 214 in operation 280. In at least some embodiments, the API key is unique to each smart object 102 that registers with the server computing device 104. In at least some embodiments, the network communication device 214 stores the API key in the memory 122.

At operation 284, the network communication device 214 requests the local network access information 117 from the server computing device 104. In at least some embodiments, the network communication device 214 includes the API key in the request for the local network access information 117. In at least some embodiments, the network communication device 214 requests the local network access information 117 using a secure protocol, such as HTTPS. In other embodiments, other protocols are used as well.

In at least some embodiments, a user or owner of the smart object 102 inputs the local network access information 117 to the server computing device 104 before the smart object 102 is installed. The server computing device 104 then associates the local network access information 117 with the smart object identifier 114 or the API key assigned to the smart object 102.

At operation 286, the network communication device 214 receives the local network access information 117 from the server computing device 104. In at least some embodiments, the server computing device 104 retrieves the local network access information 117 associated with the smart object 102 using the API key. The server computing device 104 then transmits the local network access information 117 to the network communication device 214, and the network communication device 214 receives it.

At operation 288, the network communication device 214 stores the local network access information 117. In at least some embodiments, the local network access information 117 is stored in the memory 122.

At operation 290, the network communication engine 216 attempts to connect to the network 110 through the local network access device 108 using the local network access information 117 that was received from the server computing device 104.

At operation 292, it is determined whether the network communication device 214 is connected to the network 110. If the network communication engine 216 is connected to the network, then the method 270 continues to operation 294.

If not, in at least some embodiments, the method 270 continues to operation 294. However, in at least some embodiments, the network communication engine 216 retries connecting to the network 110 a predetermined number of retry attempts before the method 270 continues to operation 294.

At operation 294, the network communication device 214 indicates an error status. In at least some embodiments, the network communication device 214 indicates an error status using the status device 218. For example, in at least some embodiments, the status device 218 emits a light or pattern of light to indicate an error. In at least some other embodiments, the status device 218 produces a sound to indicate an error. Other embodiments are possible as well.

In at least some embodiments, the method 270 terminates after operation 294. However, in at least some embodiments, the network communication engine 216 returns to operation 290 to retry connecting to the network 110 through the local network access device 108 instead. In at least some embodiments, the network communication engine 216 will make a predetermined number of retry attempts before the method 270 is terminated.

At operation 296, the network communication device 214 indicates a success status. In at least some embodiments, the network communication device 214 indicates the success status using the status device 218. For example, in at least some embodiments, the status device 218 emits a light or pattern of light to indicate success. In at least some other embodiments, the status device 218 produces a sound to indicate success. Other embodiments are possible as well.

At operation 298, the network communication engine 216 remains connected to the network 110 through the local network access device 108 and transmits and receives data from the server computing device 104. Additionally, in at least some embodiments, the network communication device 214 periodically queries the server computing device 104 to determine whether the local network access information 117 has changed. In this manner, the owner or user of the smart object 102 can update the network access information to change the network or network parameters.

After the operation 298, the method 270 repeats the operation 298. In at least some embodiments, the operation 298 will continue to loop indefinitely unless an error occurs.

Figure 6:
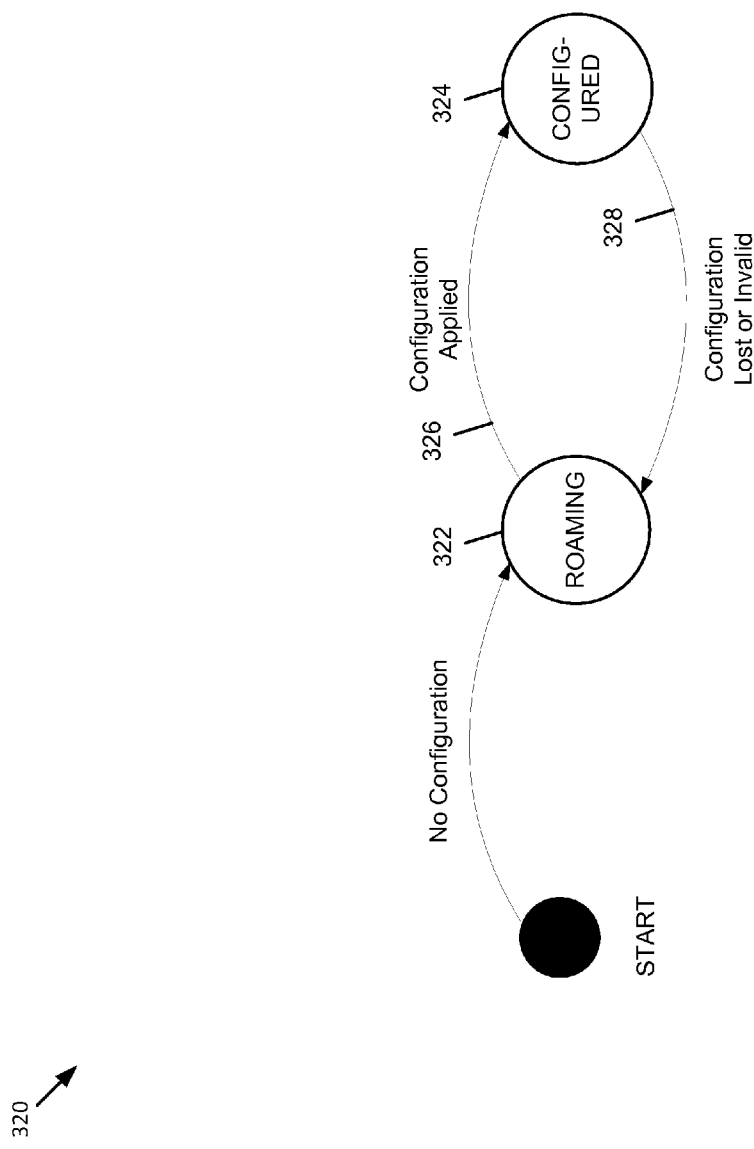
FIG. 6 is an example state diagram of an embodiment of the network communication engine of FIG. 3.

FIG. 6 is an example state diagram 320 of an embodiment of the network communication engine 216. The state diagram 320 includes roaming state 322, configured state 324, and transitions 326 and 328.

In the roaming state 322, in at least some embodiments, the network communication engine 216 is not configured and the network communication engine 216 tries to connect to the server computing device 104 to retrieve the local network access information 117. In at least some embodiments, in the roaming state 322, the network communication engine 216 connects to the initial network access device 106 or any open (unsecured) network access device that is available.

In the configured state 324, in at least some embodiments, the network communication engine 216 has configuration information, including the local network access information 117, and is configured to connect to the server computing device 104 using the local network access device 108.

At transition 326, the network communication engine 216 transitions from the roaming state 322 to the configured state 324. In at least some embodiments, transition 326 occurs when the network communication engine 216 is in the roaming state 322 and a configuration is applied. In at least some embodiments, the configuration is applied when the local network access information 117 is received from the server computing device 104 and is stored in the memory 122.

At transition 328, the network communication engine 216 transitions from the configured state 324 to the roaming state 322. In at least some embodiments, transition 328 occurs when the network communication engine 216 is in the configured state 324 and the configuration is lost or becomes invalid. In at least some embodiments, the configuration is considered lost or invalid if the network communication engine 216 is unable to connect to the network 110 using the local network access information 117.

In at least some other embodiments, the operation of the network communication engine 216 is represented by a different state diagram having fewer, more, or different states and transitions.

Figure 7:
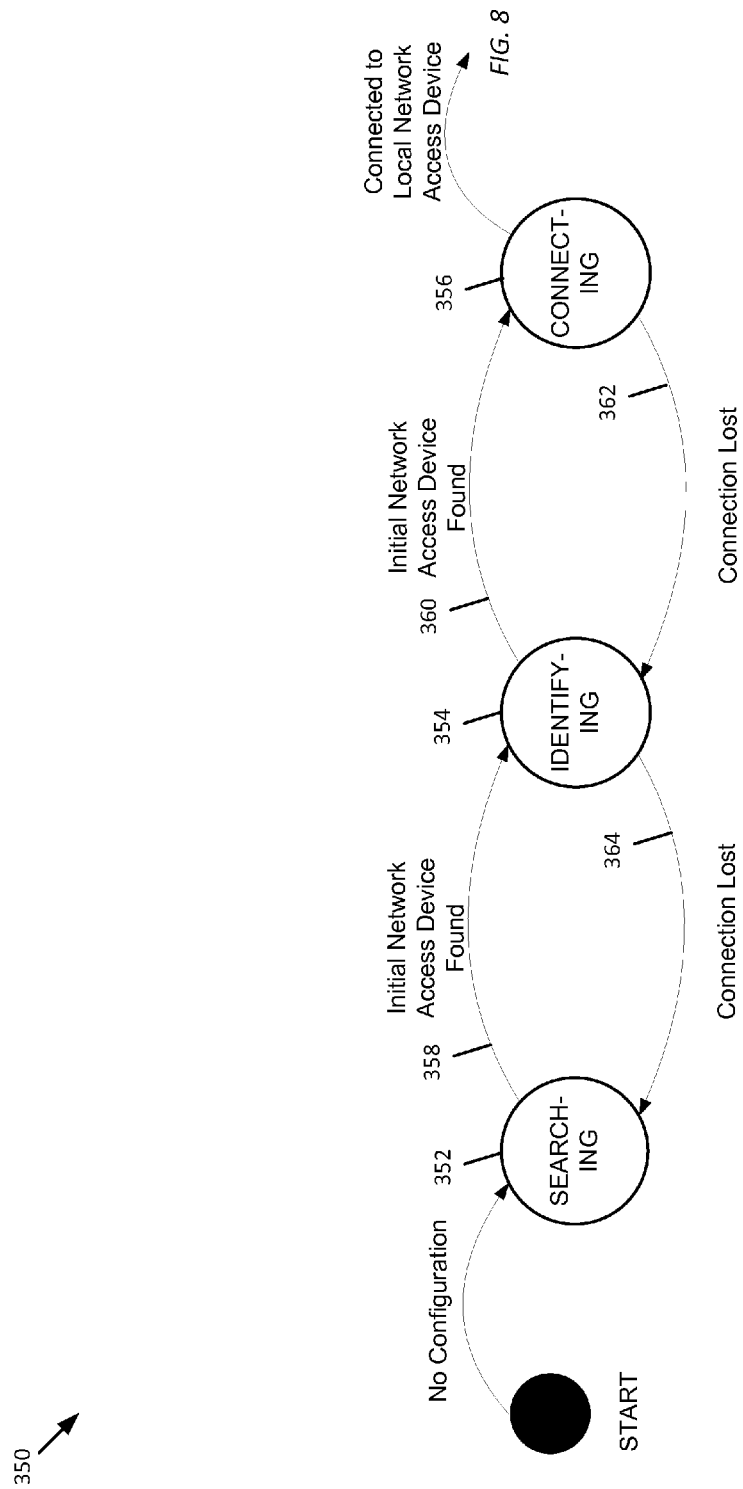
FIG. 7 is an example state diagram of the roaming state of an embodiment of the network communication engine of FIG. 3.

FIG. 7 is an example state diagram 350 of the roaming state 322 of an embodiment of the network communication engine 216. The state diagram 350 includes searching state 352, identifying state 354, connecting state 356, and transitions 358, 360, 362, and 364. In at least some embodiments, the state diagram 350 is representative of the operation of the network communication engine 216 while it is in the roaming state 322 (shown in FIG. 6).

In the searching state 352, in at least some embodiments, the network communication device 214 does not have configuration information and is not connected to the network 110. In at least some embodiments, the network communication device 214 searches for the initial network access device 106 to connect to the network 110. In at least some embodiments, the initial network access device 106 is a wireless access point with network access parameters that match the parameters that are stored in the initial network access information 112 stored in the memory 122 of the smart object 102. In at least some other embodiments, the initial network access device 106 is an unsecured network access point that the network communication device 214 can discover and connect to without any parameters. In at least some embodiments, the network communication device 214 is configured to search for either a known network or an unsecured network. When the initial network access device 106 is found, the network communication engine follows transition 358 to the identifying state 354.

In the identifying state 354, the network communication engine 216 contacts the server computing device 104. In at least some embodiments, the network communication engine 216 communicates with a web service provided by the server computing device 104. In at least some embodiments, the server computing device 104 provides configuration information for the smart object 102 and the local network access information 117 for the local network access device 108. In at least some embodiments, the configuration information for the smart object 102 includes an API key for use in future communication with the server computing device 104.

After the network communication engine 216 receives the local network access information 117, the network communication engine 216 follows transition 360 to the connecting state 356. Alternatively, in at least some embodiments, if the connection to the initial network access device 106 is lost, the network communication engine 216 follows the transition 364 back to the searching state 352.

In the connecting state 356, the network communication engine 216 disconnects from the initial network access device 106 it found in the searching state 352 and establishes a connection with local network access device 108 using the local network access information 117 that was received during the identifying state 354. If the connection to the local network access device 108 is lost, the network communication engine 216 follows the transition 362 back to the identifying state 354.

Once the network communication engine 216 has successfully connected to local network access device 108, the network communication engine transitions from the roaming state 322 (shown in FIG. 6) to the configured state 324 (shown in FIG. 6). At this point, in at least some embodiments, the state diagram 350 is no longer applicable to the network communication engine 216.

In at least some other embodiments, the operation of the network communication engine 216 is represented by a different state diagram having fewer, more, or different states and transitions.

Figure 8:
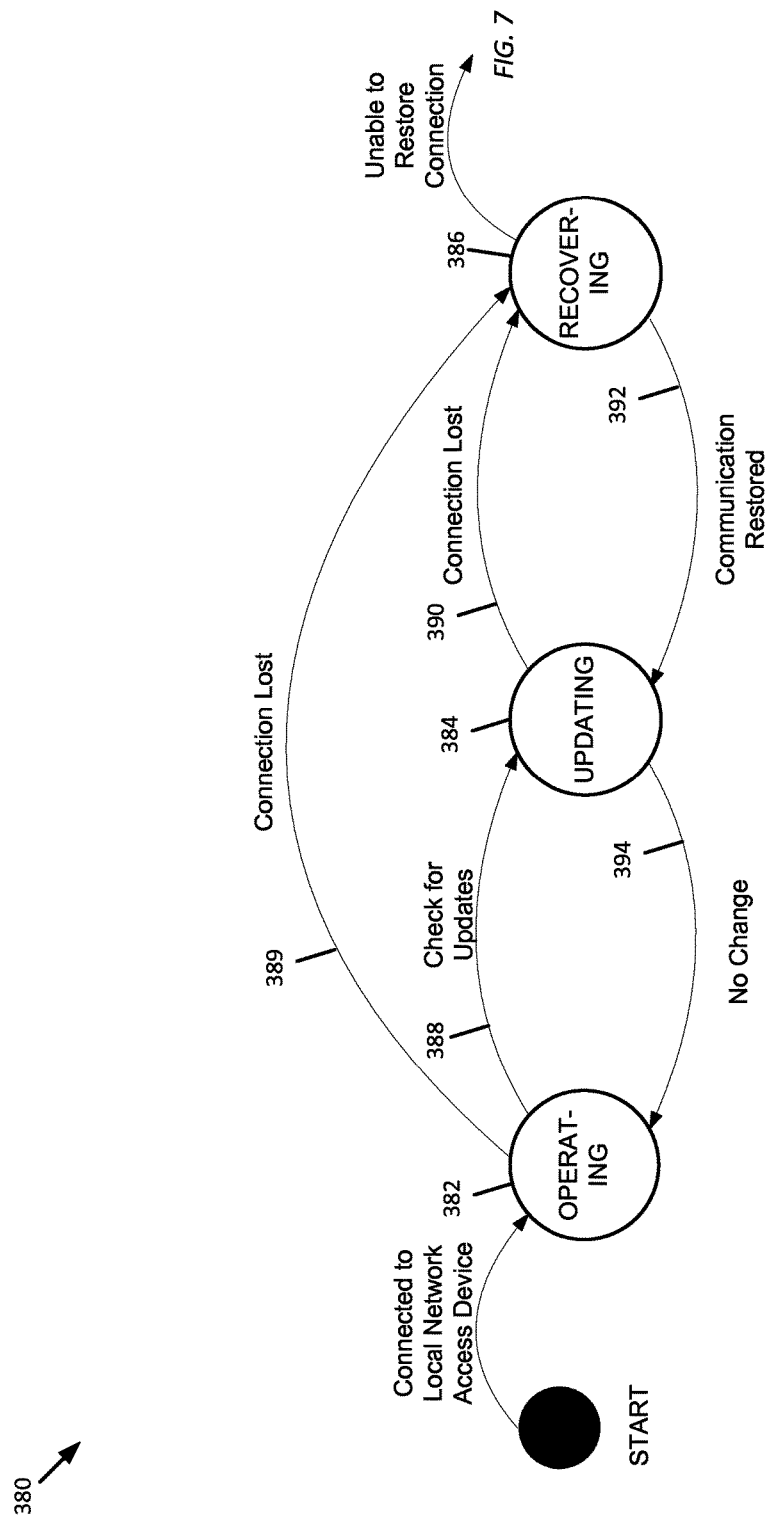
FIG. 8 is an example state diagram of the configured state of an embodiment of the network communication engine of FIG. 3.

FIG. 8 is an example state diagram 380 of the configured state 324 of the network communication engine 216. The state diagram 380 includes operating state 382, updating state 384, recovering state 386, and transitions 388, 389, 390, 392, and 394. In at least some embodiments, the state diagram 380 is representative of the operation of the network communication engine 216 while it is in the configured state 324 (shown in FIG. 6).

In the operating state 382, the network communication engine 216 is connected to the network 110 through the local network access device 108. In at least some embodiments, the network communication engine 216 transmits and receives data from the server computing device 104 across the local network access device 108.

In at least some embodiments, the network communication engine 216 periodically follows the transition 388 to the updating state 384. For example, in at least some embodiments, the network communication engine 216 includes a periodic timer and follows the transition 388 based on the periodic timer. Additionally, in some embodiments, the network communication engine 216 follows the transition 388 to the updating state 384 upon being contact by the server computing device 104, such as via a server-initiated connection.

Additionally, if the connection to the local network access device 108 is lost, the network communication engine 216 follows transition 389 to the recovering state 386.

In the updating state 384, the network communication engine 216 checks with the server computing device 104 to determine whether the local network access information 117 has been updated. If the server computing device 104 has updated the local network access information 117, the network communication engine 216 receives and stores the local network access information 117 that has been updated. Additionally, in at least some embodiments, the network communication engine 216 disconnects and transitions back to the connecting state 356 (shown in FIG. 7) to try connecting to the network 110 using local network access information 117 that is newly received. If instead, the server computing device 104 indicates that the local network access information 117 has not been updated, the network communication engine 216 follows transition 394 back to the operating state 382.

If the connection to the local network access device 108 is lost, the network communication engine 216 follows transition 390 to the recovering state 386.

In the recovering state 386, the network communication engine 216 attempts to reestablish a connection with the network 110 through the local network access device 108. In at least some embodiments, the network communication engine 216 attempts to reconnect for a duration of time or for a number of attempts. If the network connection engine is unable to reconnect to the network 110 through the local network access device 108, the network connection engine transitions back to the searching state 352 (shown in FIG. 7). If the network communication engine 216 is able to reconnect to the network 110 through the local network access device 108 and restore communication, the network communication engine 216 follows transition 392 back to the updating state 384.

In at least some other embodiments, the operation of the network communication engine 216 is represented by a different state diagram having fewer, more, or different states and transitions.

Figure 9:
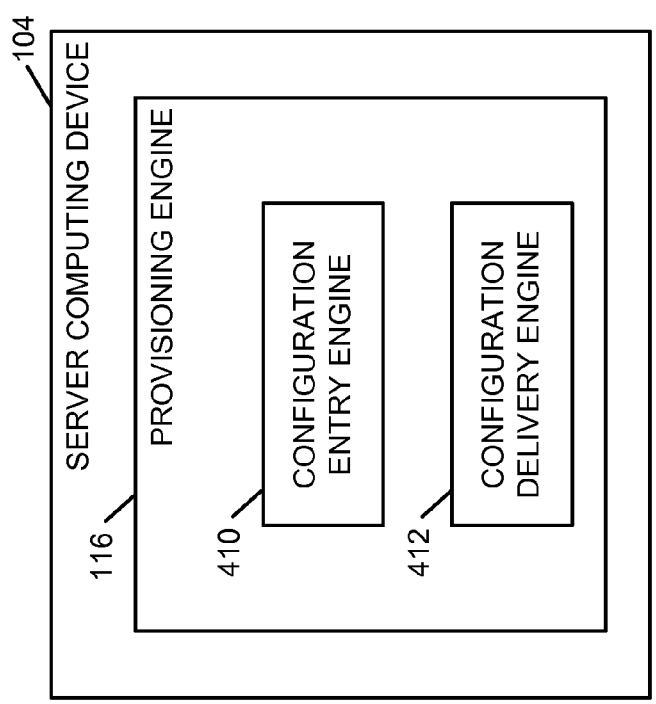
FIG. 9 is a schematic diagram of an embodiment of the provisioning engine of FIG. 1.

FIG. 9 is a schematic diagram of an embodiment of the provisioning engine 115 of the server computing device 104. In at least some embodiments, the provisioning engine 115 includes a configuration entry engine 410 and a configuration delivery engine 412. In at least some embodiments, the configuration entry engine 410 receives and stores configuration information, including the local network access information 117 for the local network access device 108. In at least some embodiments, the configuration delivery engine 412 receives requests from the smart object 102 and transmits data, including the local network access information 117 for the local network access device 108 to the smart object 102.

Figure 10:
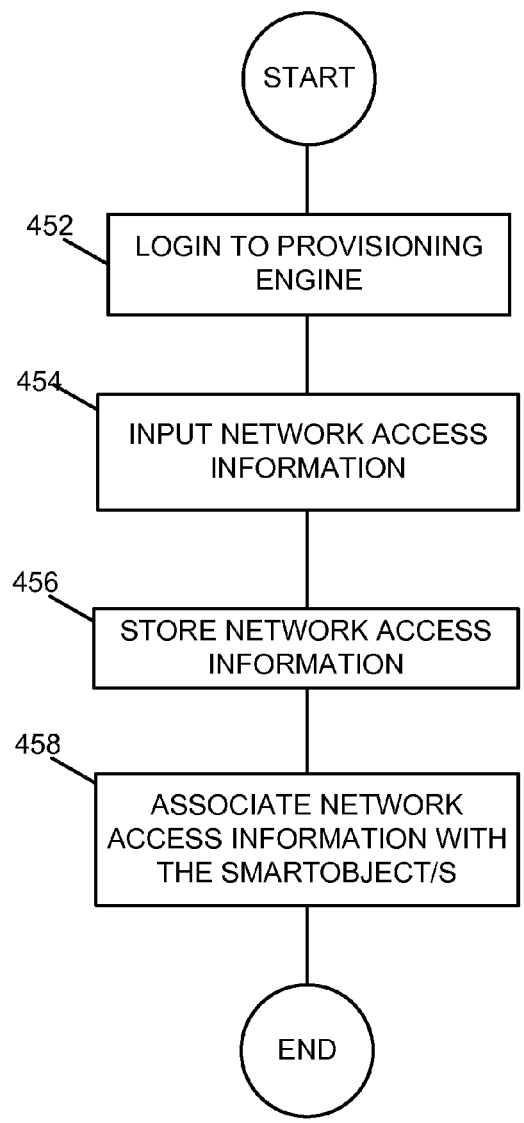
FIG. 10 is a flow chart illustrating an example method of operating the configuration entry engine of FIG. 9.

FIG. 10 is a flow chart illustrating an example method 450 of operating the configuration entry engine 410. In this example, the method 450 includes operations 452, 454, 456, and 458. In some embodiments, the method includes operations that are performed by a processor (such as the processing device 120, shown in FIG. 2). As used herein, methods include actions or operations that are performed by a user or executed by a computer, or combinations of these.

At operation 452, the user logs-in to the provisioning engine 115. In at least some embodiments, the server computing device 104 includes a web server, such as Internet Information Service (IIS) from Microsoft Corporation of Redmond, Wash. Further, in at least some embodiments, a user interface to the configuration entry engine 410 is generated by a web server and can be accessed by the user, using a client computing device, such as a personal computer, a tablet computer, a smartphone, or another computing device.

At operation 452, the user inputs the local network access information 117. In at least some embodiments, the user enters the local network access information 117 in a user interface generated by the server computing device 104. For example, in at least some embodiments, the user enters the local network access information 117 in a form on webpage that is generated by the server computing device 104.

At operation 456, the provisioning engine 115 stores the local network access information 117. In at least some embodiments, the local network access information 117 is stored in a table in the database 116.

At operation 458, the provisioning engine 115 associates the local network access information 117 with the smart object 102. In at least some embodiments, the local network access information 117 is associated directly with the smart object 102. For example, in at least some embodiments, a link (i.e., a database record ID or key) to the record containing the local network access information 117 is added to a record in a table representing the smart object 102. In at least some other embodiments, the local network access information 117 is associated with the smart object through an intermediary record, such as a record representing the user or owner of the smart object 102, or a record representing the location or environment in which the smart object 102 is being installed.

Figure 11:
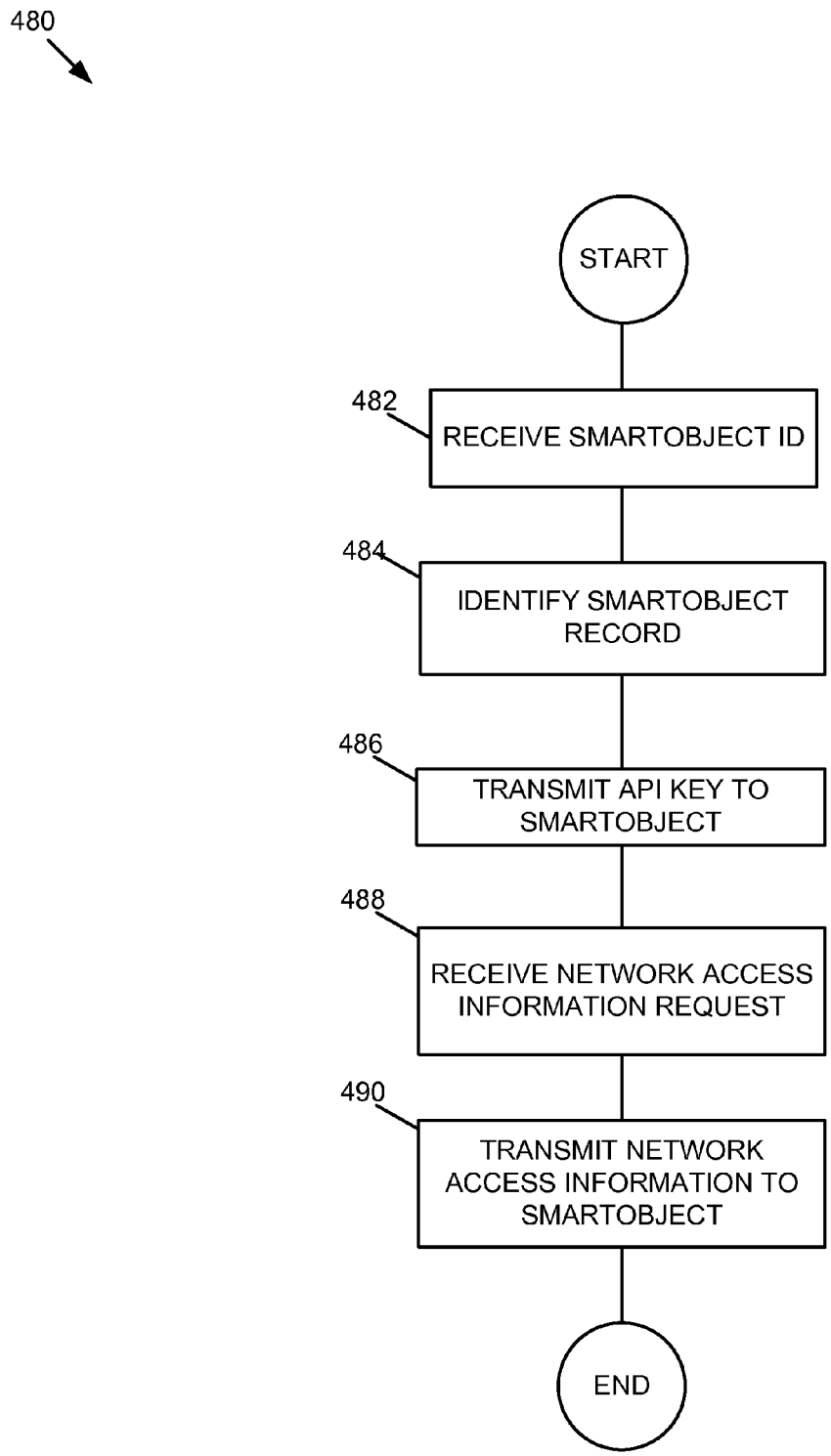
FIG. 11 is a flow chart illustrating an example method of operating the configuration delivery engine of FIG. 9.

FIG. 11 is a flow chart illustrating an example method 480 of operating the configuration delivery engine 412. In this example, the method 480 includes operations 482, 484, 486, 488, and 490. In some embodiments, the method includes operations that are performed by a processor (such as the processing device 120, shown in FIG. 2). As used herein, methods include actions or operations that are performed by a user or executed by a computer, or combinations of these.

At operation 482, the provisioning engine 115 receives the smart object identifier 114 associated with the smart object 102. In at least some embodiments, the smart object 102 sends the smart object identifier 114 to the provisioning engine 115 over using a web service provided by the server computing device 104. For example, in at least some embodiments, the smart object 102 transmits the ID using a HTTP POST or HTTP GET request.

At operation 484, the provisioning engine 115 identifies a record associated with the smart object 102 using the smart object identifier 114 that was received in operation 482. In at least some embodiments, the provisioning engine 115 identifies the record associated with the smart object 102 by querying the database 116 for smart object records with the specified smart object identifier 114. However, Other embodiments are possible as well.

At operation 486, the provisioning engine 115 transmits an API key to the smart object 102. In at least some embodiments, the API key is generated by the provisioning engine 115 the first time the smart object 102 connects. In at least some other embodiments, the API key is pre-generated for the smart object 102 and is stored in a table in the database 116. In some embodiments, the API key is used to identify the smart object 102 in future communications with the server computing device 104. In at least some embodiments, the smart object 102 receives the API key and stores in in the memory 122.

At operation 488, the provisioning engine 115 receives a request from the smart object 102 for the local network access information 117. In some embodiments, the smart object 102 communicates the request for local network access information 117 by accessing or using a particular web service. In at least some embodiments, the smart object 102 transmits the API key with the request, and the provisioning engine 115 receives the API key. In at least some of these embodiments, the provisioning engine 115 identifies the record associated with the smart object 102 using the API key. For example, in at least some embodiments, the provisioning engine 115 queries the database 116 for smart object records that match or are associated with the provided API key.

At operation 490, the provisioning engine 115 transmits the local network access information 117 to the smart object 102. In at least some objects, the provisioning engine 115 queries the database 116 for the local network access information 117 associated with the smart object 102. In some embodiments, the local network access information 117 is then transmitted over a HTTP or HTTPS protocol. For example, in at least some embodiments, the local network access information 117 is transmitted over HTTPS as an extensible markup language (XML) file.

Figure 12:
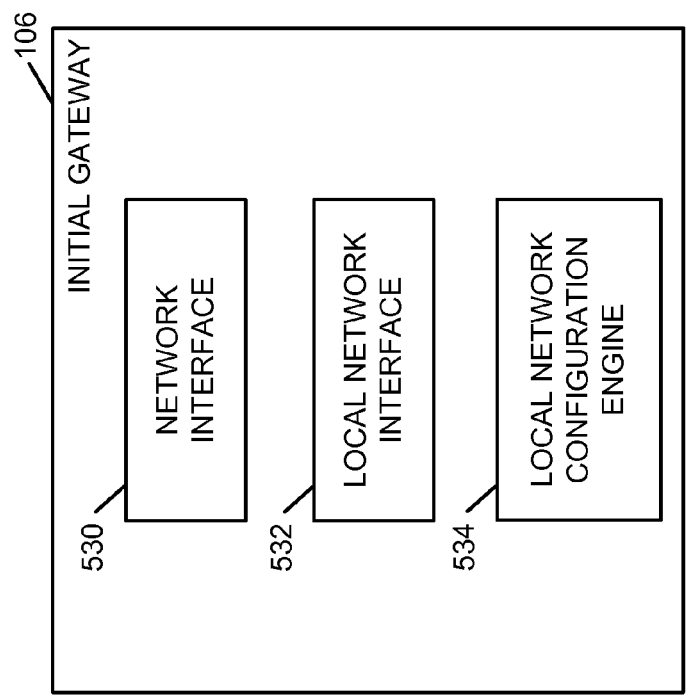
FIG. 12 is a schematic diagram of an embodiment of the initial network access device of FIG. 1.

FIG. 12 is a schematic diagram of an embodiment of the initial network access device 106. In at least some embodiments, the initial network access device 106 includes a network interface 530, a local network interface 532, and a local network configuration engine 534.

The network interface 530 operates to connect to the network 110. In at least some embodiments, the network interface 530 connects to the network 110 wirelessly. For example, in at least some embodiments, the network interface 530 connects to the network 110 using a cellular communication device. In at least some other embodiments, the network interface 530 connects to the network 110 using a different form of RF or optical communication. In yet at least some other embodiments, the network interface 530 connects to the network 110 using a wired connection.

The local network interface 532 operates to generate a local area network and to allow communication between the local area network and the network 110. In various embodiments, the local area network includes various types of links. For example, in at least some embodiments, the local area network can include wired and/or wireless links, including Bluetooth, Bluetooth Low Energy, ultra-wideband (UWB), 802.11, ZigBee, and other types of wireless links.

In at least some embodiments, the local network configuration engine 534 operates to receive user input to configure the local network interface 532. In at least some embodiments, the local network configuration engine 534 operates to generate a user interface for a user to configure the SSID, passphrase, and security mode of the local network interface 532. In at least some other embodiments, the local network configuration engine 534 operates to allow a user to configure the Bluetooth device name or address and a personal identification number (PIN) code. However, some embodiments of the initial network access device 106 do not include a local network configuration engine 534. Instead, in at least some of these embodiments, the local network interface 532 uses network parameters that cannot be altered. Other embodiments are possible as well.

Figure 13:
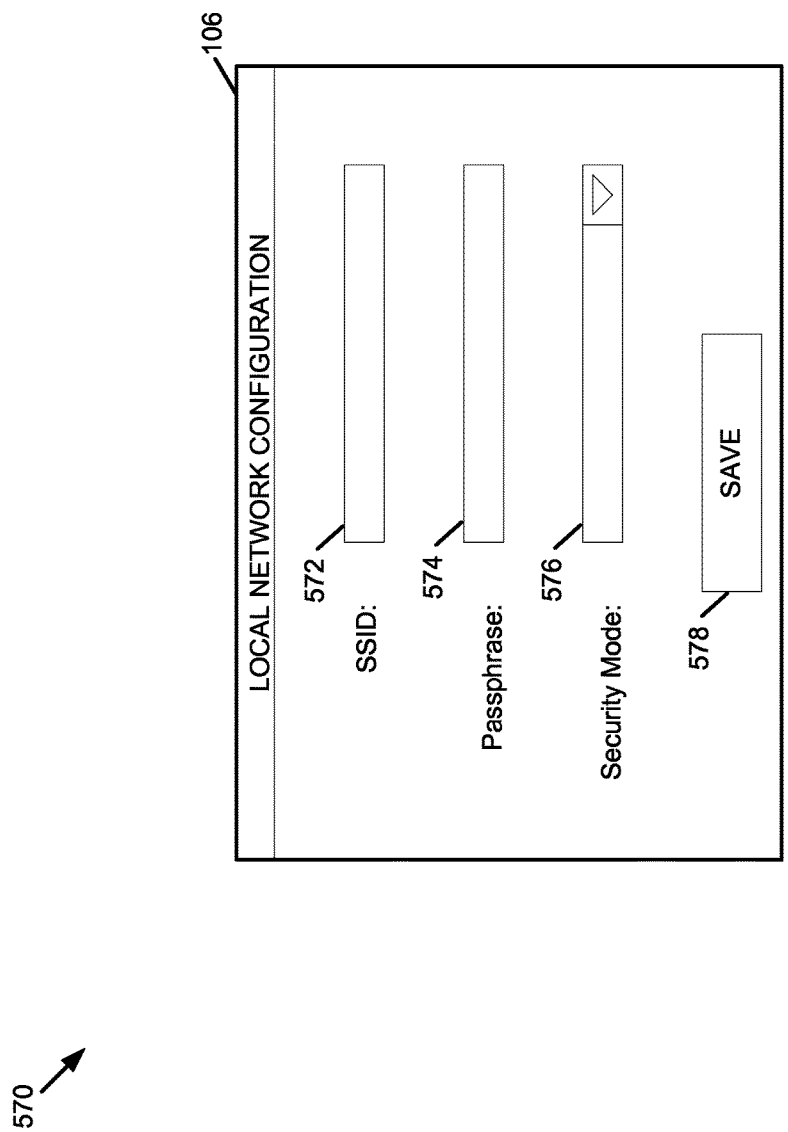
FIG. 13 is a block diagram illustrating an example layout of a user interface generated by an embodiment of the local network configuration engine of FIG. 12.

FIG. 13 is a block diagram illustrating an example layout of a user interface 570 generated by an embodiment of the local network configuration engine 534. In at least some embodiments, the user interface 570 includes an SSID input field 572, a passphrase input field 574, a security mode input field 576, and a save button 578. Other embodiments are possible as well.

In at least some embodiments, the SSID input field 572 operates to receive text input entered by a user. In at least some embodiments, the passphrase input field 574 operates to receive text input entered by a user. In at least some embodiments, the security mode input field 576 operates to present a user with a list of selections and to receive a selection from the user. For example, in at least some embodiments, the security mode input field 576 comprises a drop-down menu. However, in at least some other embodiments, the security mode input field 576 comprises a different user interface element, such as one or more checkboxes. Other embodiments are possible as well.

The save button 578 operates to receive a save command from the user. In at least some embodiments, when the save button 578 is activated, the information entered in the other fields on the interface 570 is saved. In at least some embodiments, the information entered in the other fields on the interface 570 is validated before it is saved.

Although the user interface 570 shown in FIG. 13 includes fields that are typically associated with WiFi networks, other embodiments that include fields associated with other network protocols are possible as well.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for configuring a smart object to access a network, the method comprising:
automatically connecting, by the smart object, to a first network access device using first network access information, the first network access information stored in the smart object and including information predefined to be used to connect the smart object to the first network access device, wherein the smart object uses a wireless networking protocol to connect to the first network access device;
establishing a secure data communication connection between the smart object and a server using the first network access device, wherein the secure data communication connection utilizes a secure data communication protocol;
receiving at the smart object second network access information through the secure data communication protocol from the server and through the first network access device, wherein the second network access information relates to a second network access device, the second network access information being different than the first network access information; and
using the network access information to connect to the network using the second network access device.

2. The method of claim 1, wherein the network access information comprises a service set identifier (SSID) and a passphrase.

3. The method of claim 1, wherein the network access information comprises a Bluetooth device address and a personal identification number (PIN) code.

4. The method of claim 1, wherein the first network access device is a portable device carried and used by an installer, wherein the installer installs the smart object at a predetermined location.

5. The method of claim 1, wherein the first network access information includes at least one of a service set identifier (SSID), a passphrase, and a security mode.

6. The method of claim 1, wherein the smart object further stores a smart object identifier configured to identify the smart object to the server.

7. The method of claim 6, wherein the smart object identifier includes at least one of a serial number and a media access control (MAC) address of the smart object.

8. The method of claim 1, wherein the smart object includes a functional object configured to perform a function, and a sensor system configured to measure a property of the functional object.

9. The method of claim 1, wherein the network access information is stored in the server.

10. The method of claim 9, wherein the network access information is provided to the server by a user of the smart object before the smart object is connected to the network via the first network access device.

11. A smart object, the smart object comprising:
a functional object, the functional object being configured to perform a function;
a sensor system, the sensor system being configured to measure a property of the functional object; and
a network communication engine comprising:
a central processing unit that is configured to control the network communication engine; and
a computer readable data storage medium storing software instructions that, when executed by the central processing unit, cause the network communication engine to:
automatically connect to a first network access device using first network access information, the first network access information stored in the smart object and including information predefined to be used to connect the smart object to the first network access device, wherein a wireless networking protocol is used to connect the smart object to the first network access device;
establish a secure data communication connection between the smart object and a server using the first network access device, wherein the secure data communication connection utilizes a secure data communication protocol;
receive at the smart object second network access information through the secure data communication protocol from the server through the first network access device, wherein the second network access information relates to a second network access device, the second network access information being different than the first network access information;
use the network access information to connect to the network using the second network access device; and
transmit measurements from the sensor system to the server.

12. The smart object of claim 11, wherein the first network access device is a portable device carried and used by an installer, wherein the installer installs the smart object at a predetermined location.

13. The smart object of claim 11, wherein the network access information is provided to the server by a user of the smart object before the smart object is connected to the network via the first network access device, the network access information stored in the server.

14. A method of installing a smart object, the method comprising:
transporting an initial network access device to a local environment, wherein the smart object is positioned in the local environment;
activating the initial network access device to provide access to a network;
activating the smart object to:
automatically connect to the initial network access device using initial network access information, the initial network access information stored in the smart object and including information predefined to be used to connect the smart object to the initial network access device, wherein the smart object uses a wireless networking protocol to connect to the initial network access device;
establish a secure data communication connection between the smart object and a server using the initial network access device, wherein the secure data communication connection utilizes a secure data communication protocol;
receive at the smart object the local network access information through the secure data communication protocol from the server through the initial network access device, the local network access information being different from the initial network access information; and
connect to the local network access device, using the local network access information; and
deactivating the initial network access device.

15. The method of claim 14, further comprising:
  removing the initial network access device from the local environment.

16. The method of claim 14, wherein the local network access information is provided to the server by a user of the smart object before the smart object is connected to the network via the initial network access device, the local network access information stored in the server.

17. The method of claim 14, wherein the smart object includes a functional object configured to perform a function, and a sensor system configured to measure a property of the functional object.

* * * * *